US007355745B2

(12) United States Patent
Hudson et al.

(10) Patent No.: US 7,355,745 B2
(45) Date of Patent: Apr. 8, 2008

(54) DOCUMENT-TO-PRINTER COLOR GAMUT MATCHING

(75) Inventors: Kevin R. Hudson, Camas, WA (US); Huanzhoa Zeng, Vancouver, WA (US)

(73) Assignee: Hewlett Packard, San Diego ( * ) Notice: Subject to any disclaimer, the term of this patent is extended or adjusted under 35 U.S.C. 154(b) by 769 days.

(21) Appl. No.: 09/835,163

(22) Filed: Apr. 13, 2001

(65) Prior Publication Data

US 2002/0149786 A1 Oct. 17, 2002

(51) Int. Cl.
- H04N 1/60 (2006.01)
- H04N 1/54 (2006.01)
- H04N 1/56 (2006.01)
- G09G 5/02 (2006.01)
- G09G 5/06 (2006.01)

(52) U.S. Cl. ............ 358/1.9; 358/1.13; 358/1.15; 358/296; 358/518; 358/530; 358/501; 345/589; 345/590; 345/591; 345/593; 345/382; 382/162; 382/163; 715/526; 715/527; 715/528

(58) Field of Classification Search ........ 345/589–591, 345/593; 358/1.9, 1.13, 1.15, 296, 518, 530, 358/501; 382/162–163; 715/528
See application file for complete search history.

(56) References Cited

U.S. PATENT DOCUMENTS

| 5,508,826 | A | * | 4/1996 | Lloyd et al. ................ 358/501 |
| 5,668,636 | A | * | 9/1997 | Beach et al. ................ 358/296 |
| 5,806,081 | A | * | 9/1998 | Swen et al. ................. 715/528 |
| 6,173,072 | B1 | * | 1/2001 | Linder ........................ 382/162 |
| 6,198,843 | B1 | * | 3/2001 | Nakauchi et al. ........... 382/167 |
| 6,222,648 | B1 | * | 4/2001 | Wolf et al. .................. 358/504 |
| 6,229,915 | B1 | * | 5/2001 | Ohkubo ...................... 382/167 |
| 6,268,930 | B1 | * | 7/2001 | Ohta et al. ................... 358/1.9 |
| 6,437,792 | B1 | * | 8/2002 | Ito et al. ..................... 345/600 |
| 6,480,299 | B1 | * | 11/2002 | Drakopoulos et al. ....... 358/1.9 |
| 6,549,654 | B1 | * | 4/2003 | Kumada ..................... 382/162 |
| 6,603,483 | B1 | * | 8/2003 | Newman ..................... 345/593 |
| 6,606,165 | B1 | * | 8/2003 | Barry et al. ................. 358/1.9 |
| 6,633,400 | B1 | * | 10/2003 | Sasaki et al. .............. 358/1.15 |
| 6,646,762 | B1 | * | 11/2003 | Balasubramanian et al. . 358/1.9 |
| 6,693,718 | B1 | * | 2/2004 | Takaoka .................... 358/1.15 |
| 6,757,071 | B1 | * | 6/2004 | Goodman et al. ......... 358/1.13 |
| 7,046,391 | B1 | * | 5/2006 | Barry et al. ................. 358/1.9 |
| 7,161,710 | B1 | * | 1/2007 | MacLeod .................... 358/1.9 |
| 7,230,737 | B1 | * | 6/2007 | Ohga ......................... 358/1.9 |
| 2001/0043357 | A1 | * | 11/2001 | Owa et al. ................. 358/1.15 |

(Continued)

*Primary Examiner*—Twyler Lamb
*Assistant Examiner*—Beniyam Menberu
(74) *Attorney, Agent, or Firm*—Lee & Hayes, PLLC

(57) ABSTRACT

A document-to-printer color gamut matching system enables comparison of at least two color maps in a manner that allows selection of the printer that will result in the best print output. Information related to the document to be printed and information describing the color gamut(s) that each available printer is capable of printing is compared. Each color gamut is evaluated to determine suitability for use with the document. The document-to-printer gamut matching system may provide the author of the document with a number of candidate printers best matched to the printing of the document depending on the rendering intent of the author; may select a printer based on a measurement of best fit; or may generate a custom color map to result in a color gamut that is satisfactory.

20 Claims, 6 Drawing Sheets

U.S. PATENT DOCUMENTS

2002/0163669 A1* 11/2002 Yamazaki et al. ......... 358/3.23
2003/0164968 A1* 9/2003 Iida ............................ 358/1.9
2004/0135793 A1* 7/2004 Nakajima ................... 345/591
2007/0263237 A1* 11/2007 Robinson .................... 358/1.9

* cited by examiner

DOCUMENT-TO-PRINTER COLOR GAMUT MATCHING

TECHNICAL FIELD

This invention concerns document-to-printer color gamut matching. More particularly, this invention relates to the discovery of the color gamut information associated with each of a plurality of printers; to the evaluation and selection of a printer, and a color map on that printer, which is most appropriate to print the document; and to custom document color gamut to printer color gamut mapping.

BACKGROUND

In many applications, such as graphic arts production, it is important that the colors in a printed document match the colors that were desired or expected when the document was created. The expectation may be based on the CRT monitor representation, or based on specifications found in swatch books or embedded within integrated circuits. Ideally, all of the colors in the document would be contained within the "device colors" of the printing device, where device colors are the range of colors accurately processed by a particular device without resorting to color mapping. Unfortunately, containment of a document within the device colors is rarely realized. This is particularly true for subtractive ink-and-media printing systems, which have less color range than most input devices such as scanners or additive output devices such as CRT monitors.

The color gamut of a typical CRT monitor far exceeds that of a printer. Some exceptions may be found in the extreme yellow and cyan-green areas where a printer may have slightly more color range than many monitors. Nevertheless, it follows that a document composed on a monitor may contain colors that cannot be reproduced on a printer. This condition can result in mismatches between the composed document and the printed document.

One way to solve this problem is to limit the colors in the composed document to those colors reproducible by a given printer. This is often not practical, however, since the printer gamut information is not always available. This method also makes the document device-specific and non-portable. A document created in this fashion could not be printed satisfactorily on other printers with different color gamuts, and would have a color space that would appear limited when viewed with a CRT monitor. This would negatively impact documents also used in Internet applications.

A second way to solve the problem is to employ a gamut mapping algorithm. Gamut mapping is a process by which the colors found within a document to be printed are converted by a mapping process into a printer's device colors. Thus, a printer's color gamut would include the printer's device colors, as well as colors that could reasonably be mapped to device colors. Therefore, gamut mapping increases the ability of printers to print documents having a diverse color gamut.

Unfortunately, no gamut mapping algorithm is without drawbacks. As a result, several competing gamut-mapping strategies have relative merits. Each is based on satisfying differing "rendering intents" of the document's author. For example, the rendering intent may be accuracy. In this case, colors within the document that are also within the printer's device colors are reproduced unchanged; other colors are mapped as little as possible to bring them within the printer's device colors. Alternatively, the rendering intent may be perceptual. In this case, colors not within the printer's device colors are mapped onto device colors, and colors within the printer's device colors are mapped to other device colors, thereby preserving some of the relative spacing between colors. Such a strategy tends to preserve the perception of color transitions, but is less successful at preserving accuracy.

A related problem may result where the region corresponding to the device colors of a printer exceed the requirements of a document to be printed. In this case, the gamut mapping may needlessly and automatically be employed, resulting in undesired gamut compression.

In view of the above limitations, printers' generalized gamut mapping algorithms tend to result in color errors related to accuracy, perception and combinations of both. Accordingly, it would be beneficial to develop a document-to-printer color gamut matching system that provides a better match between the color gamut requirements of a document and the color gamut space of a printer.

SUMMARY

A document-to-printer color gamut matching system and method of use allows comparison of the color space of a document to be printed with at least two color gamuts associated with at least one printer, and assists in the selection of the color gamut and printer that will result in the best print output.

According to one aspect of the color gamut matching system, an analysis is performed on the color gamut requirements of a document to be printed. The document's requirements are typically analyzed in terms of a device independent color space, such as CIELab.

The color gamut requirements of the document are evaluated for fit with respect to at least two gamuts associated with at least one printer. The printer gamuts are obtained from libraries that are regularly maintained in response to changes in the availability of printers, and to changes in the color maps present on any given printer. The gamut libraries include gamut-mapping tables typically based on maximizing some combination of absolute colorimetric, perceptual- and saturation-based rendering intents, wherein a rendering intent controls trade-offs made during the rendering process. The color gamut information associated with each printer may be obtained and stored in a variety of manners. Each printer's gamut information may be obtained from the printer's manufacturer, based on product, model or technology, or may be obtained from each printer in real-time by analyzing the data obtained by sensors located along the paper path.

Boundary analysis on the color gamuts of the document and the printers is performed. The boundary analysis is preformed by calculation using an algorithm, whereby a sampling of input color values and measured output values are compared.

A fit analysis is performed on the boundaries to determine which color gamut is the best fit for the document to be printed. The fit analysis typically compares gamut volumes in CIELab space; statistical variations between boundaries; a percentage of document colors found within a printer's color gamut; or other test.

Preferences of the document's author are taken into account during the fit analysis. The document's author may prioritize perceptual-, accuracy- and relative-based rendering intent. The document's author may also preview on a CRT or other output device approximations of the document's printed appearance based on one or more printer's gamuts.

Custom gamut mapping may be used to create a color map for a printer if no printer's gamut is sufficiently close to the document's requirements. The color gamut is typically created for the printer having device colors that are closest to the requirements of the document.

BRIEF DESCRIPTION OF THE DRAWINGS

The same numbers are used throughout the drawings to reference like features and components.

DETAILED DESCRIPTION

Overview

A document-to-printer color gamut matching system is disclosed, whereby the color gamut required to print a document may be compared to at least two color gamuts of at least one printer in a manner that allows selection of the color gamut and printer that will result in the best print output. In operation, information related to the document to be printed and information describing the color gamut(s) that each available printer is capable of printing are compared. Each printer's gamut information may be obtained from the printer's manufacturer, based on product model or technology type, or may be obtained and updated from each printer in real-time by analysis of the data obtained by sensors located along the paper path. Some printers may have a plurality of color gamuts, wherein each gamut is supported by a color map based on a particular rendering intent. The color gamut information may be stored within the printer's profile, and may be located in the printer, a printer server or other device. Each color gamut is evaluated to determine suitability for use with the document. The document-to-printer gamut matching system may provide the author of the document with a number of candidate printers best matched to the printing of the document depending on the rendering intent of the author; e.g. absolute colorimetric, perceptual- or saturation-based rendering intent. Alternatively, the gamut matching system may select a printer based on an algorithm or an expert system. If no gamut is sufficiently close to the document's requirements, a printer having characteristics most easily modifiable to the requirements of the document may be selected, and a custom color map may be generated to result in a color output that is satisfactory.

Exemplary Printing Environment

Figure 1:
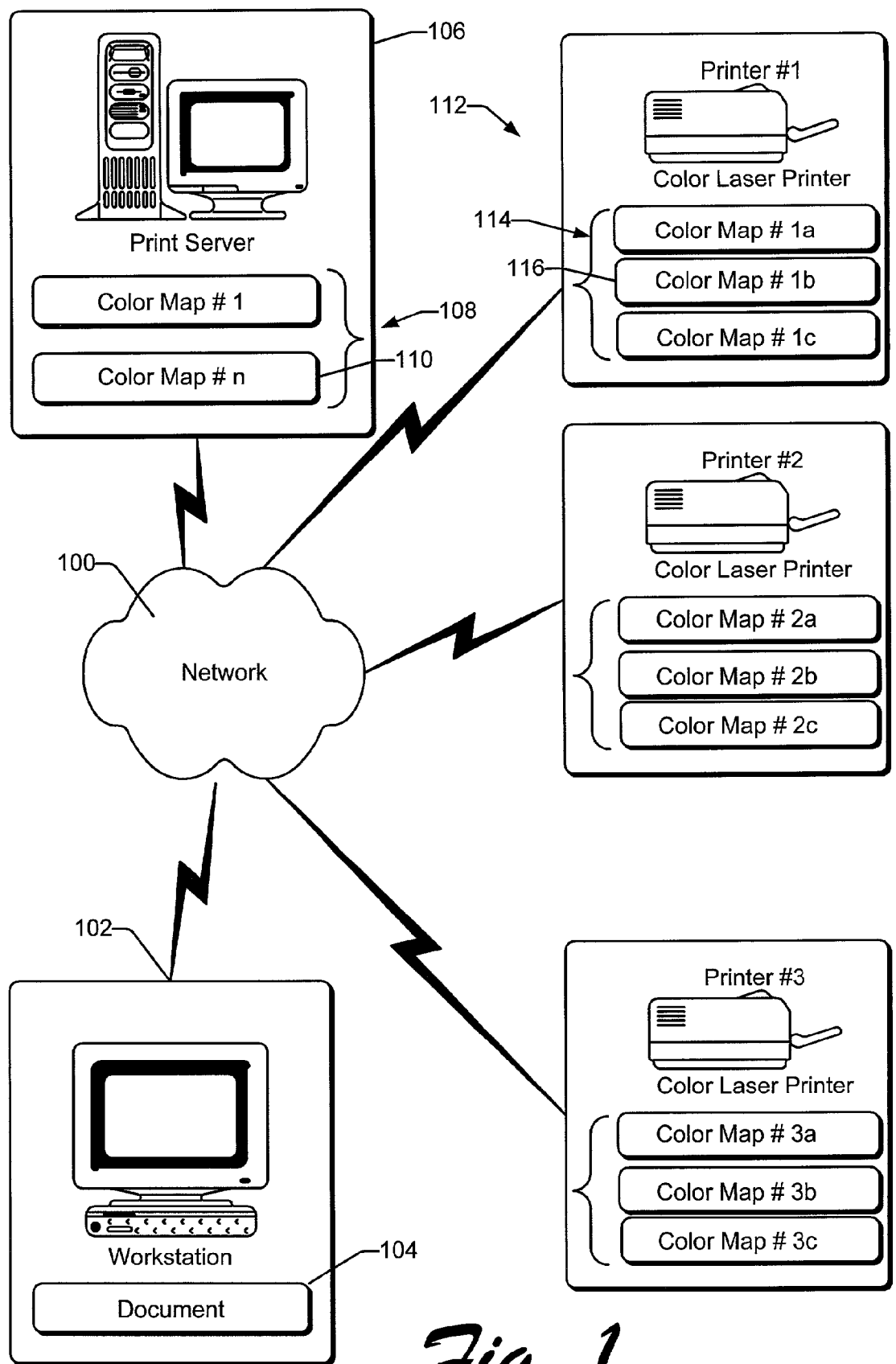
FIG. 1 is a block diagram illustrating an exemplary printing environment.

FIG. 1 illustrates a printing system adapted for use with a document-to-printer color gamut matching system. The printing system is defined within an environment that includes a plurality of devices connected to a network 100. The printing environment of FIG. 1 is generalized, in the sense that a similar printing environment can comprise any number of servers, workstations, and printers that are coupled to one another via a data communication network 100. Network 100 can be any type of network, such as a local area network (LAN) or a wide area network (WAN), using any type of network topology and any network communication protocol. For reasons of illustrative clarity, only a few devices are shown coupled to the network. However, in some applications the network may have tens or hundreds of devices coupled to one another. Furthermore, the network may be coupled to one or more other networks, thereby providing coupling between a greater number of devices. Such can be the case, for example, when networks are coupled together via the Internet.

A workstation 102 is representative of a number of workstations that may be connected to the network. As seen in FIG. 1, the workstation may have a document 104 having color information that an author desires to print. At least one print server 106 is typically available to coordinate the printing of documents sent by the workstation. The print server may include a color gamut map library 108, including a plurality of color maps 110.

A plurality of printers 112 is connected to the network. In the implementation of FIG. 1, the printers are color ink jet printers. However, color output devices based on color laser, CRT, liquid crystal or other technologies could be substituted. When the color maps are not stored on a print server, each printer may have a library 114 including at least one color map 116.

The color maps 110, 116 associated with each printer may be obtained and stored in a variety of manners. Each printer's gamut boundary may be constructed from the printer's color map. Alternatively, a printer might be configured with appropriate sensors so that gamut boundaries can be constructed in real time in response to actual printing characteristics of the printer. Once obtained, the color gamut information may be stored in the printer's profile. A printer profile is a data structure enumerating the printer's characteristics. The profile may be stored on the printer, a printer server or other location.

Figure 2:
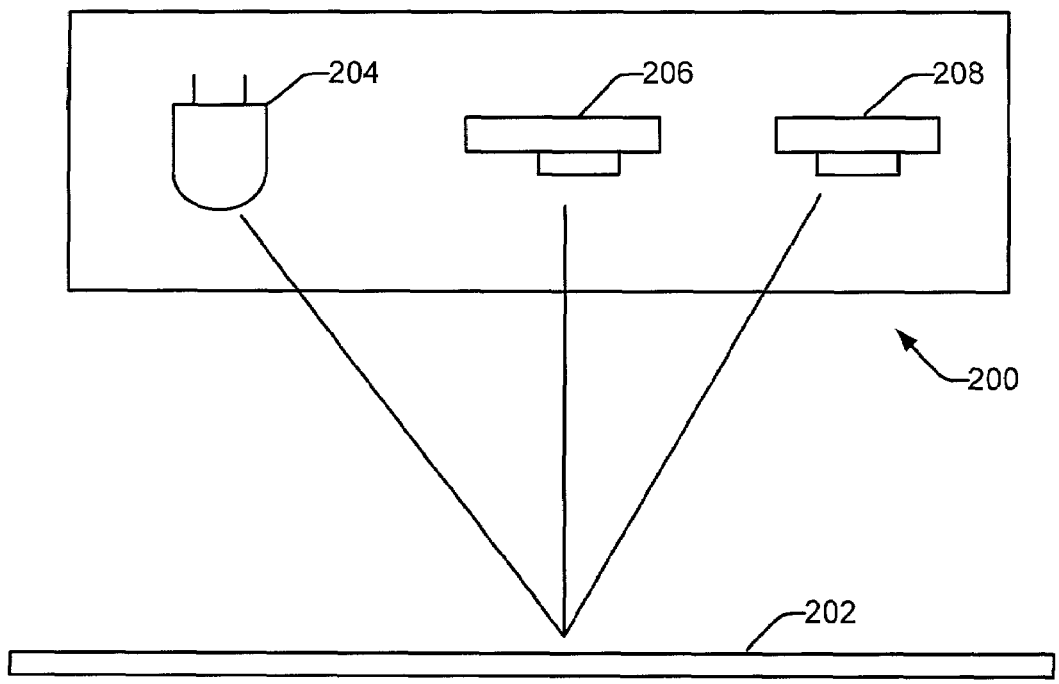
FIG. 2 is a diagram illustrating sensors within the paper path of a printer used to collect color data from printed media.

FIG. 2 shows a sensor array 200 contained in the paper path of a printer 112, and used to collect data in real time from a color document 202 as it is printed. Color information obtained from the sensors provides the data needed to update in real-time the extent of the "device colors," i.e. the colors the printer can actually print. The gamut over which the device colors extend is influenced by temperature, humidity, printer condition, the age and quality of the ink and other factors. As a result, use of the sensor array allows the extent of the color space of the device colors to be carefully monitored.

By continuously monitoring the color space spanned by the device colors, the gamut boundaries may be continuously updated. The color maps function to map a desired color within the printer's gamut to one of the device colors. The device color to which the document color is mapped is determined by the rendering intent governing trade-offs made during the construction of the color map. If the color space of the device colors changes, a desired device color may not be available, and the gamut boundaries must be changed accordingly. For example, if the gamut boundaries of the device colors recedes somewhat, the color maps should be updated, to allow mapping of gamut colors to device colors that can actually be printed. Failure to update the color maps in response to changes in the device colors results in a faulty mapping process, by which one color that the printer cannot accurately print is mapped to another such color. This results in a reduction of printer accuracy and print quality.

Information from the sensors allows association of CIELab color values with actual color output. As a result, the range of the color space of the device colors can be monitored in real time with respect to an objective standard. The color maps may then be modified, if needed, to result in most advantageous use of the device colors currently available.

Sensor array 200 includes an LED 204 that illuminates the printed document 202. The sensor array of FIG. 2 also has first and second light-to-voltage converters 206 and 208. First light-to-voltage converter 206 is exposed to diffuse light moving generally perpendicularly to the color document. Second light-to-voltage converter 208 is exposed to specular light moving from the paper at an angle equal to the angle of incidence. Use of such measurements allows calculation of the color space of the printer's device colors, and allows color maps 110, 116 to be updated periodically. The measurements also allow comparison of the document color space and device colors.

Figure 3:
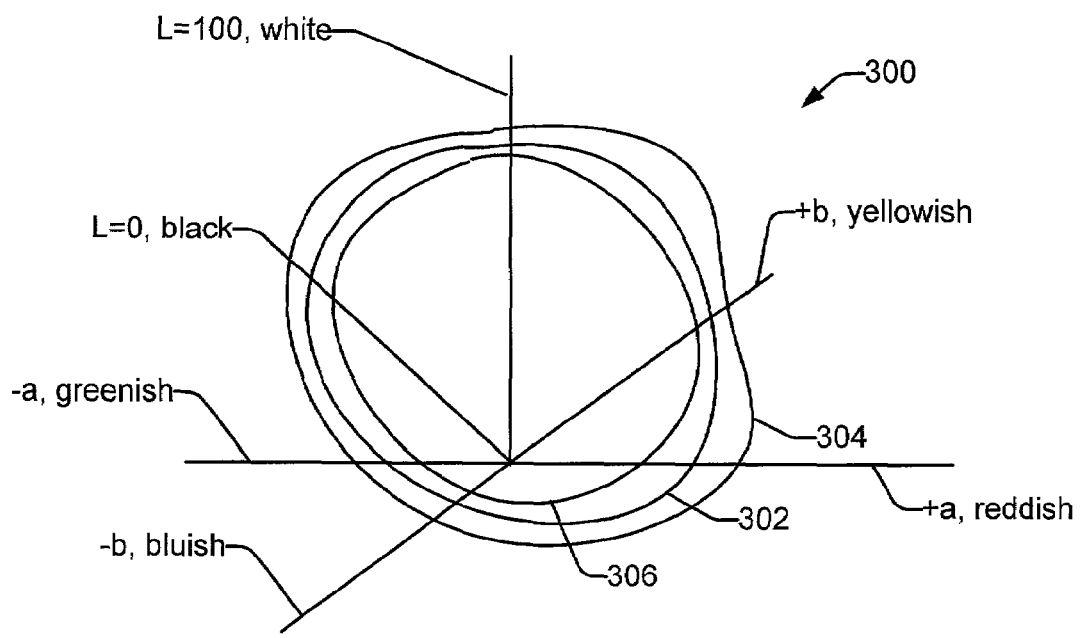
FIG. 3 is a diagram representing CIELab color space, showing the color gamuts of two exemplary printers, and a document to be printed.

FIG. 3 illustrates CIELab color space 300, which is more properly known as 1976 CIE L*a*b* Space. CIELab is the second of two standards adopted by the CIE in 1976 as color models that illustrate uniform color spacing in their values.

FIG. 3 shows the color gamuts of two exemplary printers and a document to be printed, in a three-dimensional view in which an L-axis corresponds to lightness; an a-axis is reddish at one end and greenish at the other; and a b-axis is yellowish at one end and bluish at the other. A closed curve 302 represents a three-dimensional form enclosing the color gamut required for ideal printing of a document. A second closed curve 304 represents the color gamut exhibited by a printer chosen from among those on the network 100 having the ability to print the document. A third closed curve 306 represents a three-dimensional form enclosing the color gamut exhibited by a printer not having the ability to print the document. The third three-dimensional form 306 is entirely within, i.e. a subset of, the form 302 required for ideal printing of the document; therefore, the printer associated with form 306 would be unable to print the document in an ideal manner.

Figure 4:
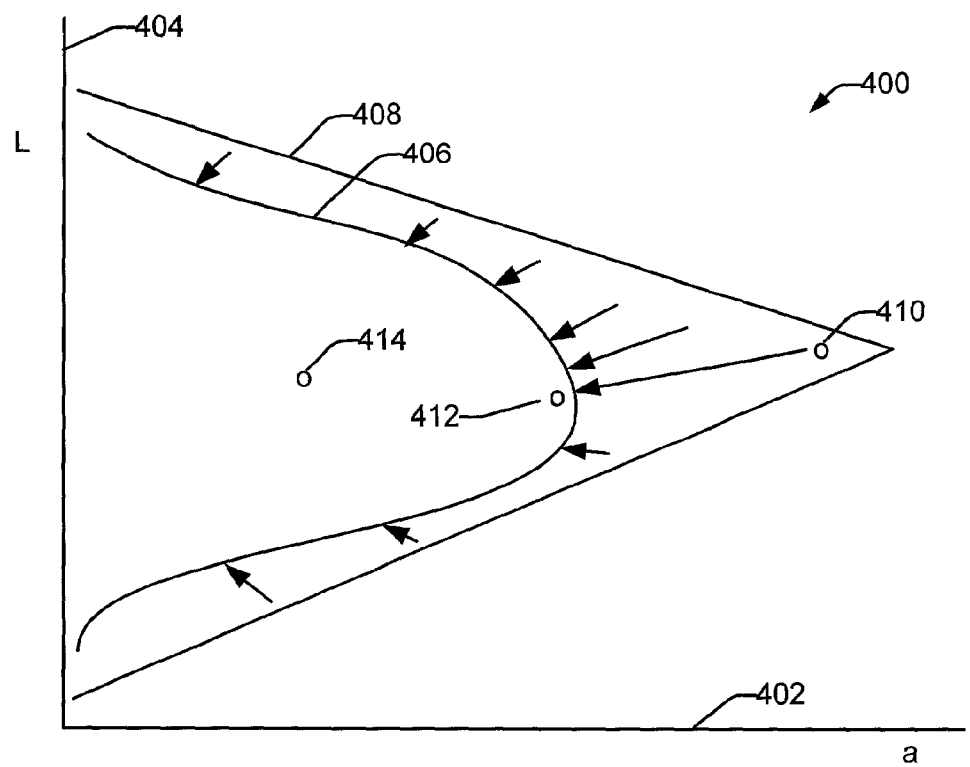
FIG. 4 is a diagram illustrating a gamut mapping strategy based on absolute colorimetric ICC rendering intent.

FIG. 4 shows a gamut mapping strategy 400 based on an absolute colorimetric rendering intent. FIG. 4 can be best visualized as a two-dimensional slice of CIELab space similar to that of FIG. 3, showing only the horizontal a-axis 402 and the vertical L-axis 404 for purposes of illustration. A curve 406 illustrates the outer extent of the "device colors," i.e. the colors the printer can actually print. The curve 408 illustrates the outer extent of an input color space, i.e. colors that the printer, which when asked to print, does so by substituting colors that can actually be printed. Colors 410, outside the device colors but inside the input space, are mapped to colors 412 at the device gamut (device colors) surface. Such mapping allows the printer to approximate colors 410 that cannot be accurately printed. Colors 414, entirely within the device colors, are not mapped, thereby preserving their accuracy.

Figure 5:
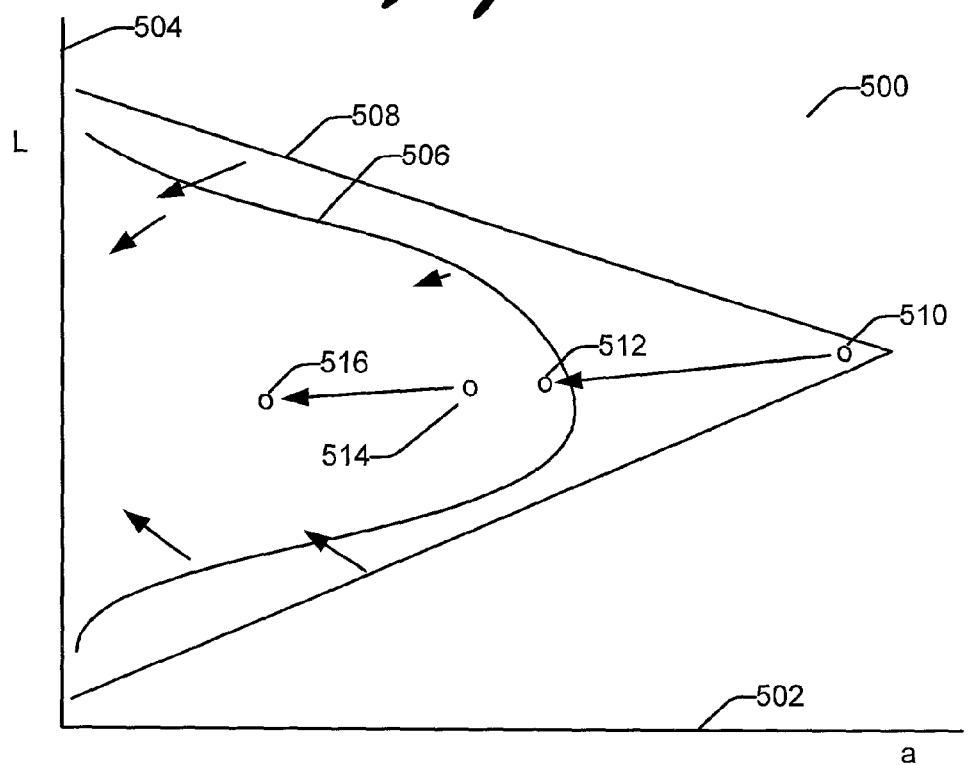
FIG. 5 is a diagram illustrating a gamut mapping strategy based on ICC perceptual rendering intent.

FIG. 5 shows a gamut mapping strategy 500 based on a perceptual rendering intent. FIG. 5 is also configured as a two-dimensional slice of CIELab space, showing only the horizontal a-axis 502 and the vertical L-axis 504 for purposes of illustration. A curve 506 illustrates the outer extent of the device colors. The curve 508 illustrates the outer extent of an input space. For example, a color 510, outside the device colors but inside the input space, is mapped to a color 512 within the region of the device colors, allowing the printer to approximate colors that cannot be accurately printed. Color 514, entirely within the device colors, is mapped to color 516, thereby preserving the viewer's sense of perception of the relative differences between colors.

Figure 6:
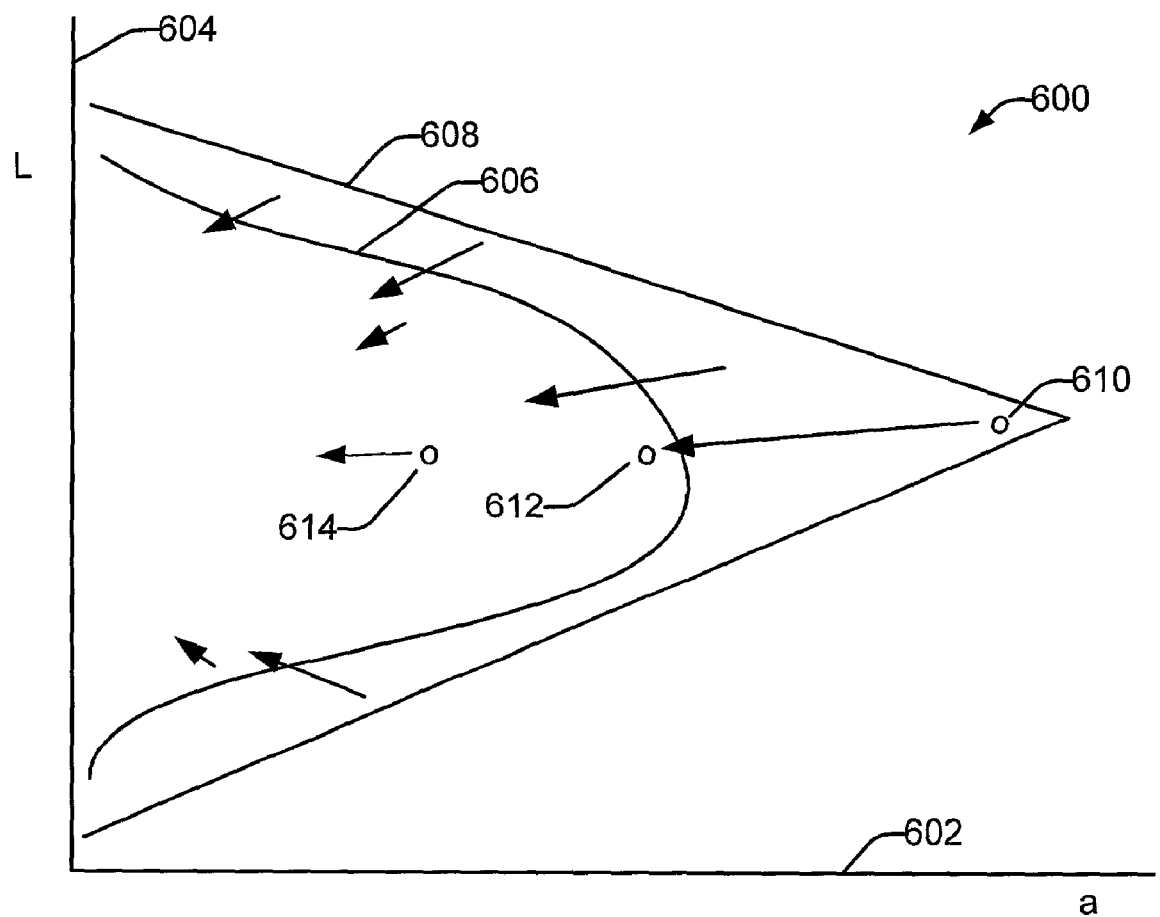
FIG. 6 is a diagram illustrating a custom rendering intent.

FIG. 6 shows a custom rendering intent 600, having similarity to the mapping strategies of FIGS. 4 and 5. FIG. 6 is also configured as a two-dimensional slice of CIELab space, showing only the horizontal a-axis 602 and the vertical L-axis 604 for purposes of illustration. Curves 606, 608 illustrate the outer extent of the device colors and the input space, respectively. Color 610, outside the device colors but inside the input space, is mapped to a color 612 within the region of the device colors, allowing the printer to approximate colors that cannot be accurately printed. Color 614, entirely within the device colors, is mapped to a lesser degree than seen in FIG. 5. As a result, the mapping combines some of the advantages and disadvantages of the mapping strategies seen in FIGS. 4 and 5.

Exemplary Print System Architecture

Figure 7:
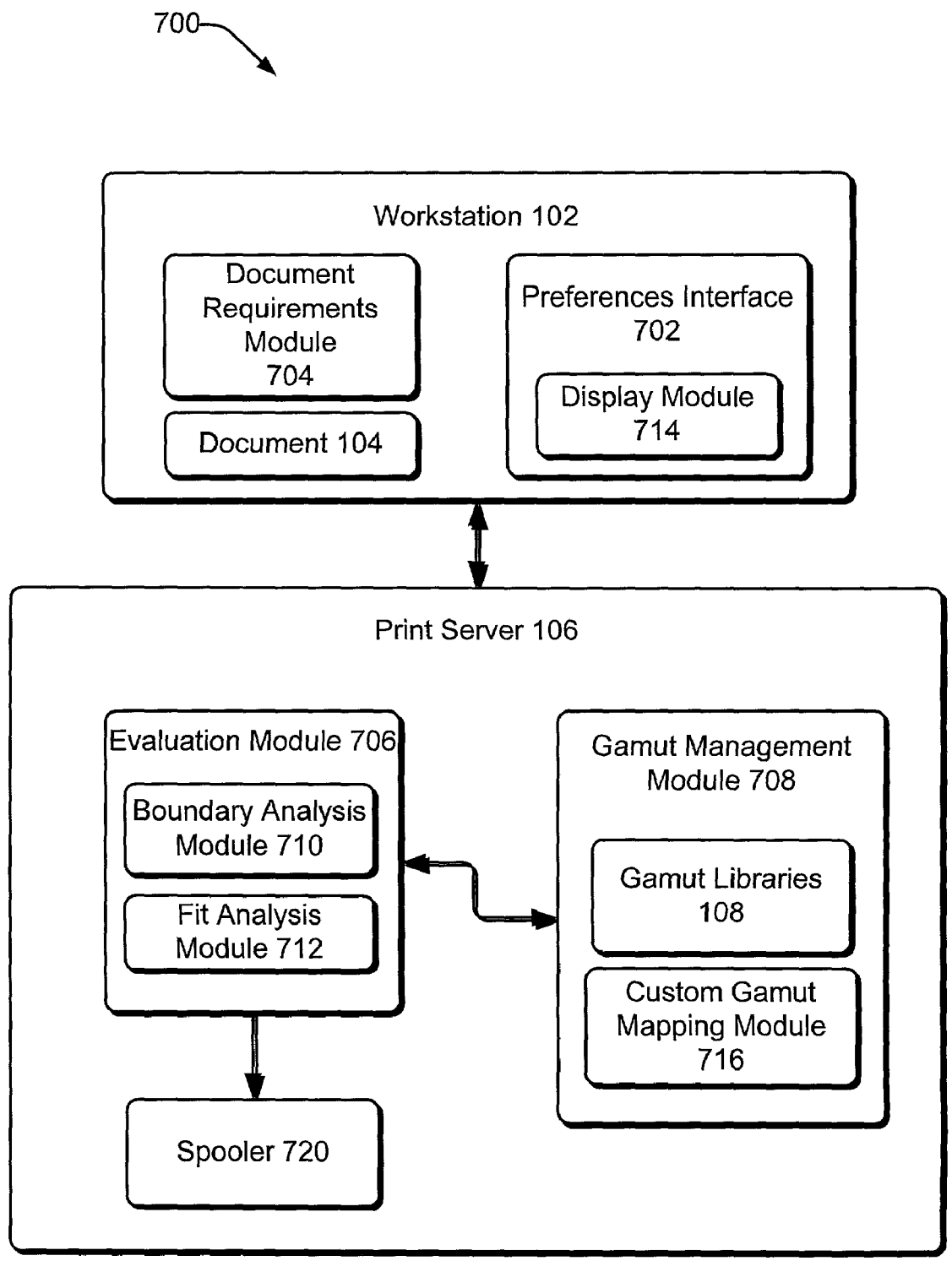
FIG. 7 is a block diagram illustrating the relationship between exemplary software structures supporting the functionality of document-to-printer color gamut matching.

FIG. 7 shows the relationship between exemplary software modules supporting the functionality of a document-to-printer color gamut-matching system 700. The modules seen in FIG. 7 are exemplary, and therefore could be consolidated, fragmented, or otherwise rearranged to result in similar functionality. Similarly, while suggested locations for some modules are indicated, alternate locations could be used. Each software module includes computer- or controller readable media having computer- or controller-readable instructions, which when executed by a controller within a workstation, printer server or printer result in the functionally described. Hardware equivalents to the software instructions may be substituted.

FIG. 7 shows pertinent components of workstation 102 and print server 106. Pertinent components of workstation 102 include document 104, a preferences interface 702, and a document requirements module 704. Pertinent components of print server 106 include an evaluation module 706, a gamut management module 708, and a spooler 720.

Preferences interface 702 allows the author of a document to select from among different color gamut mapping strategies. For example, the author may use the preferences interface to instruct the evaluation module 706 to obtain color maps consistent with one of the gamut mapping strategies seen in FIGS. 4 through 6. In particular, the preferences interface 702 could allow the author to select an accuracy-based mapping strategy, such as seen in FIG. 4. The preferences interface is adapted to communicate this information to the evaluation module 706, either over a network or via interprocess communication, where appropriate.

Document requirements module 704 is typically located on the workstation or print server. In particular, the document requirements module may be incorporated within a document-generating application such as a word processor, a print driver, or may be a stand-alone application. The document requirements module is capable of network communication, and capable of transmitting the color gamut requirements of a document to be printed.

The documents requirements module is adapted to assemble the characteristics of the color document 104, in a manner that provides sufficient information for the evaluation module 706 to determine the color space and requirements of the document. In most cases, all colors associated with the document may be converted into a device independent format, such as CIELab. The document requirements module is adapted to communicate this information to the evaluation module 706, either over a network or via interprocess communication, where appropriate.

The evaluation module 706 is adapted to receive information from the preferences interface 702 and the document requirements module 704. The evaluation module is also adapted to query the gamut management module 708 for information on individual gamuts. The evaluation module is further adapted to select the printer and gamut most suited to the requirements of the document to be printed. This selection process is made within the constraints of the color gamut information related to the document, the author's preferences, and the available printer's color gamuts.

A gamut management module 708 catalogs and organizes gamut libraries 108, 114, which include color maps associated with at least one printer. In many implementations, the gamut management module may catalog a large number of color maps, maintaining information including the date of the color map's creation, the printer with which it is associated, the location of the color map, the location of the printer and other data as desired. The color maps may reside on the print server, on the individual printers with which they are associated, or in both locations.

The gamut management module 708 is configured to respond to the evaluation module 706 with specific color gamut mapping information associated with one or more color gamuts, derived from one or more color printers. Typically, the color gamut information transferred to the evaluation module is in a format that is device independent, such as CIELab, and can include tabular information with content to that seen in FIGS. 4 through 6.

The color map libraries include information associated with a number of printers. The information included within the gamut library may be obtained and stored in a variety of manners. For example, the color gamut information may be stored in within the printer's profile. The printer's profile may be stored on the printer, a printer server or other location. Each printer's gamut information may be obtained from the printer's color map, which may be obtained from the manufacturer or based on product model or family, or may be obtained for each printer in real-time by analyzing the data obtained by sensors located along the paper path.

A boundary analysis module 710 is adapted to perform calculations on each color gamut to determine the boundaries. Determination of the boundaries allows analysis of the fit between printers' color gamuts and a document's color space requirements. The boundary analysis calculations may be made mathematically, by constructing a color gamut boundary. The boundary is constructed by choosing, for a particular color gamut and associated printer, a sampling of input color values that will produce device output colors that lie on the gamut boundary. Using the input values associated with the output colors, the color gamut boundary can be constructed in the chosen color space. The color space should be device-independent, such as the CIELab color space seen in FIG. 3, so that different devices and color gamuts may be equally and objectively compared.

A fit analysis module 712 is adapted to perform a best-fit analysis, i.e. the calculations needed to determine the desirability of the match between the document and each color gamut. The gamut matching system may select a printer based on an algorithm or an expert system. The algorithm may be based on any of several methods to analyze the fit between the document and a color gamut. In many cases, the choice of algorithm used may be governed by the preferences indicated by the author within the preferences interface 702. For example, the author is particularly concerned about accuracy or perceptual rendering intents. The fit analysis module may perform mean and maximum difference calculations on the boundaries of the color space required by the document and the color space associated with the various printers' color gamuts, to determine the best fit. Alternatively, the fit analysis module may calculate and compare volumes of the color space associated with the document and the color gamuts. As a still further alternative, the fit analysis module may compare the percentage of the document area or the percentage of the colors used by the document that are included within the printer's color gamut.

A display module 714 allows the document's author to view, on a display such as a CRT, approximations of what the document would look like when printed out using different printers and different color maps. It is generally the case that a video display will have a color space that is greater than most printers. As a result, an approximation of the printed document, based on a given printer and a given color map, may be made on the video display. The document author may view several such approximations, and select one of for printing.

A gamut-mapping module 716 is adapted to transform document colors if no gamut is sufficiently close to the requirements for the document. A printer having characteristics most easily modified to the requirements of the document may be selected, and a custom gamut mapping done to result in satisfactory printing of the document. Using the preferences interface 702, a custom gamut-mapping module 716 allows the document author to request gamut mapping having a custom mixture of rendering intents, such as accuracy and perception, based on the device colors of a particular printer.

A print spooler 720 receives the document 104 with instructions indicating the printer to which the job should be sent, and the color map with which the printer should perform the print job.

Exemplary Method of Document-to-Printer Color Gamut Mapping

Figure 8:
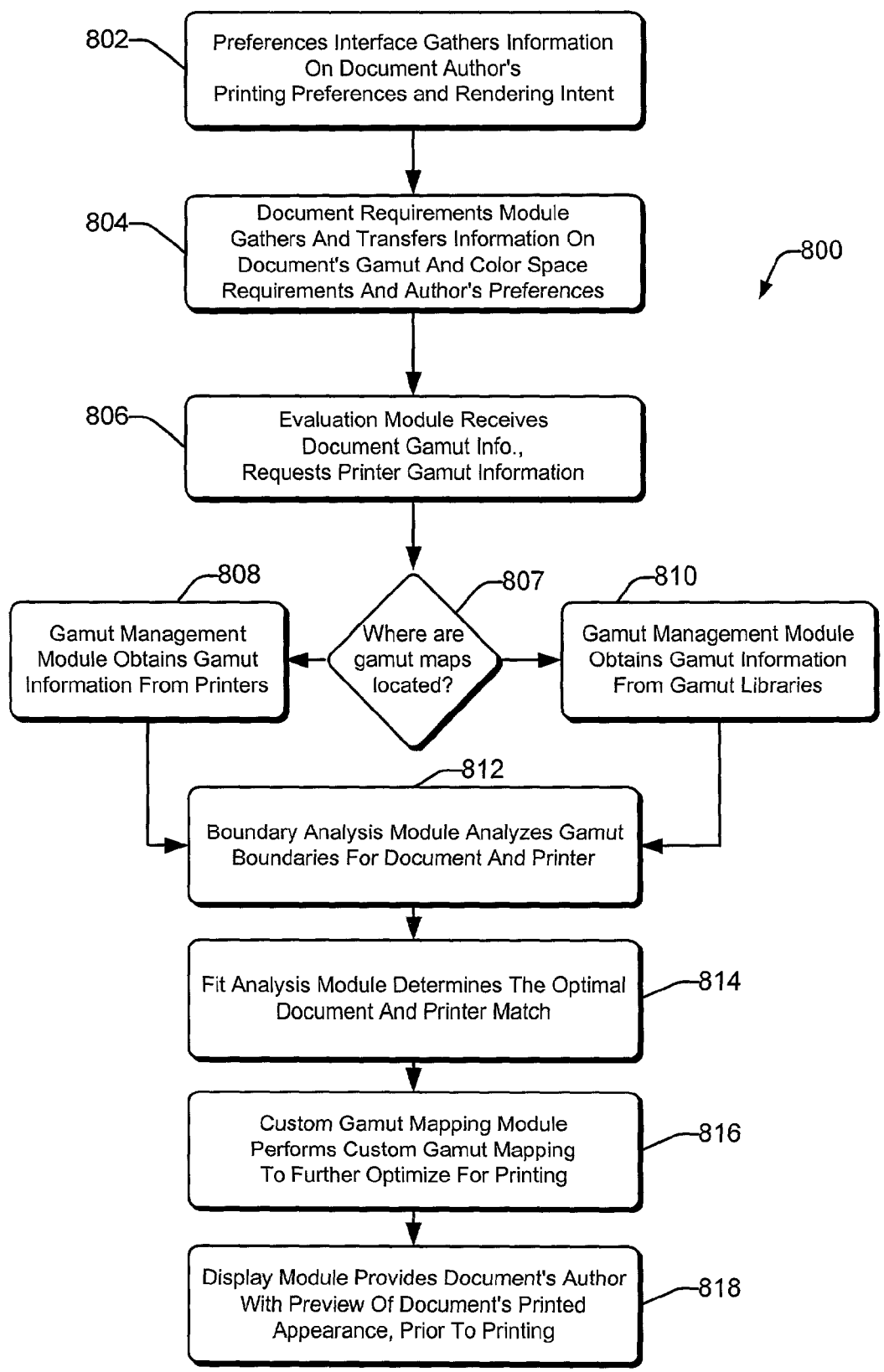
FIG. 8 is a flow diagram illustrating a method of document-to-printer color gamut matching.

FIG. 8 shows a method 800 by which a printer, and a particular color map associated with the printer, may be selected for use in printing a color document. At block 802, the preference interface 702 gathers information on the document author's printing preferences. The preferences may include such factors as the rendering intent of the author. For example, the author may want to stress either an accuracy-based rendering (such as seen in FIG. 4) or a perception-based rendering (such as seen in FIG. 5). The preferred rendering intent will act as a constraint on the operation of the best-fit analysis module 712.

At block 804, the document requirements module 704 obtains information on the document's color space requirements, attaches the author's preferences, and transfers the data to the evaluation module 706.

At block 806, the evaluation module 706 receives the color gamut requirements of the document to be printed, and receives information on the author's gamut preferences. The evaluation module requests the gamut management module to send printer gamut information.

At block 807, the gamut management module determines if the color maps are located in local libraries or remotely on various printers.

At block 808, if the gamut information is stored on individual printers, then this information is retrieved from each printer.

At block 810, in the case where gamut information is stored in gamut libraries resident on the print server or other location, gamut management module 708 accesses the gamut information.

At block 812, a boundary analysis module 710 analyzes the boundaries of the document and printer color gamuts.

At block 814, the fit analysis module 712 performs a best-fit analysis, i.e. determining which gamut, associated with which printer, is the best fit with respect to the color space of the document to be printed, given the boundaries of the printer color maps determined at block 812.

At block 816, if needed, the custom gamut-mapping module 716 performs custom gamut mapping to further optimize the gamut selected by the fit analysis module.

At block 818, if desired, the display module 714 provides the document's author with a preview of the document's printed appearance on a CRT or other output device prior to printing. If the author approves of the appearance, the document is printed through the spooler 720. If not, the process may be reinitiated.

Conclusion

By taking into account the preferences of a document's author and the color gamut requirements of a document, and by evaluating the boundary and fit of the color gamuts of available printers or by creating a custom gamut mapping, selection of the most compatible color map available is possible, and the best print output may be realized.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for printing, comprising:
    obtaining color space requirements of a document to be printed, wherein the requirements define a boundary of a color space associated with the document;
    obtaining a rendering intent from an author;
    selecting a printer from among a plurality of printers based on a best fit as determined by the color space requirements of the document, the rendering intent of the author and gamuts of each of the plurality of printers, wherein each gamut defines a boundary of a device colors space indicating colors printable by the printer; and
    determining if color mapping is needed, and if so selecting a color map from a selection comprising:
        a first color map based on an absolute colorimetric rendering intent; and
        a second color map based on perceptual rendering intent;
    wherein selecting based on the best-fit comprises:
        comparing the color space requirements of the document with a device colors space of each of two or more printers; and
        comparing how well each printer would respond to an author's indicated preference for absolute colorimetric rendering intent or perceptual rendering intent.

2. The method of claim 1, wherein selecting the color map additionally comprises:
    giving an author an opportunity to select a color map that balances preservation of color accuracy against color separation; and
    using the selected color map in printer selection.

3. The method of claim 1, wherein the selection of color maps additionally comprises:
    a third color map, which balances not mapping device colors to preserve their accuracy against mapping device colors to preserve color separation between device colors and colors mapped into the device colors space, wherein the balancing comprises mapping device colors by less distance within the device colors space than they are mapped by the second mapping.

4. The method of claim 1, additionally comprising:
    mapping colors within the document according to the selected color map; and
    printing the document.

5. The method of claim 1, wherein determining if color mapping is needed is based on the color space requirements of the document, the rendering intent of the author and the device colors space of the selected printer.

6. The method of claim 1, wherein selecting the printer based on best-fit, comprises:
    comparing volumes of the color space requirement of the document to the gamuts of each of the plurality of printers;
    comparing a percentage of colors within the document included in each of the gamuts of each of the plurality of printers; or
    comparing area within the document associated with colors in each of the gamuts of each of the plurality of printers.

7. The method of claim 1, wherein gamuts of each of the plurality of printers are obtained from a library of printer gamut information.

8. The method of claim 1, wherein gamuts of each of the plurality of printers are obtained directly from the printers themselves.

9. A print system, comprising:
    a documents requirement module configured to obtain a color space requirements of a document to be printed, wherein the requirements define a boundary of a color space associated with the document;
    a preferences interface configured to obtain a rendering intent from an author; and
    an evaluation module configured for selecting a printer from among a plurality of printers based on a best fit as determined by the color space requirements of the document, the rendering intent of the author and gamuts of each of the plurality of printers, wherein each gamut defines a boundary of a device colors space indicating colors printable by the printer;
    wherein the evaluation module determines if color mapping is needed, and if so uses a color map from a selection comprising:
        a first color map based on absolute colorimetric rendering intent; and
        a second color map based on perceptual rendering intent;
    wherein the evaluation module determines the best fit by a method comprising:
        comparing the color space requirements of the document with a device colors space of each of two or more printers; and
        comparing how well each printer would respond to an author's indicated preference for absolute colorimetric rendering intent or perceptual rendering intent.

10. The print system of claim 9, wherein the selection additionally comprises:
    a third color map, configured combine characteristics of the first and second color maps.

11. The print system of claim 9, wherein the print system is configured to allow selection between the color maps, and the selection comprises:

selecting the color map based on absolute colorimetric rendering intent when user input indicates a preference to preserve color accuracy within the device colors space; and selecting a color map based on perceptual rendering intent when user input indicates a preference to preserve color separation between colors within the device colors space and colors outside the device colors space.

12. The print system of claim 9, wherein the evaluation module obtains the gamuts of each of the plurality of printers from:

a library of printer gamut information; or directly from the plurality of printers.

13. The printer system of claim 9, wherein the printer system is configured to allow selection between the first and second color map based on an author's indicated preference for absolute colorimetric rendering intent or perceptual rendering intent.

14. The printer system of claim 9, additionally comprising:

a sensor array configured to evaluate printed documents and update the boundary defining the device colors space of each printer.

15. A print system configured to select a printer to print a document, comprising:

a plurality of printers, wherein a gamut of each printer is defined by a boundary indicating a device colors space comprising colors printable by the printer;

a sensor array configured to evaluate printed documents and update the boundary defining the device colors space for each printer;

a print server configured to select a printer from among the plurality of printers, wherein the selecting is based on a best fit analysis as determined by color space requirements of the document, a rendering intent of an author and gamuts of each of the plurality of printers; and a custom gamut mapping module, comprising:

a first color map based on absolute colorimetric rendering intent, wherein colors outside the boundary of a device colors space are mapped to the boundary of the device colors space, and colors within the device colors space are not mapped to preserve their accuracy; and a second color map based on perceptual rendering intent, wherein colors outside the boundary of the input color space are mapped into the device colors space, and colors within the device colors space are mapped to preserve color separation between the them and the colors mapped into the device colors space;

wherein the best-fit analysis, comprises:

comparing the color space requirements of the document with an input color space of each of two or more printers; and selecting a printer from among those compared according to a criterion based in part on an author's indicated preference for absolute colorimetric rendering intent or perceptual rendering intent.

16. The print system of claim 15, wherein the custom gamut mapping module additionally comprises:

a third color map configured to map device colors by less distance in the device colors space than the colors are mapped by the second mapping.

17. The print system of claim 15, wherein the print system is configured to allow selection between the color maps, and the selection comprises:

selecting the color map based on absolute colorimetric rendering intent when user input indicates preference to preserve color accuracy within the device colors space; and selecting a color map based on perceptual rendering intent when user input indicates preference to preserve color separation between colors within the device colors space and colors outside the device colors space.

18. The print system of claim 15, wherein the print system is configured to allow selection between the color maps, and the selection additionally comprises:

selecting a color map that balances preservation of color accuracy and color separation when indicated by user input.

19. The print system of claim 15, wherein determining if color mapping is needed is based on the color space requirements of the document, the rendering intent of the author and the device colors space of the selected printer.

20. The print system of claim 15, wherein the best-fit analysis, comprises:

using an algorithm to determine best fit, wherein the algorithm is selected in response to input from the author.

* * * * *

UNITED STATES PATENT AND TRADEMARK OFFICE
CERTIFICATE OF CORRECTION

PATENT NO. : 7,355,745 B2
APPLICATION NO. : 09/835163
DATED : April 8, 2008
INVENTOR(S) : Kevin R. Hudson et al.

It is certified that error appears in the above-identified patent and that said Letters Patent is hereby corrected as shown below:

On the Title Page Item (75), under "Inventors", delete "Huanzhoa Zeng" and insert -- Huanzhao Zeng --, therefor.

In column 12, line 3, in Claim 15, after "between" delete "the".

Signed and Sealed this

Twelfth Day of August, 2008

JON W. DUDAS
*Director of the United States Patent and Trademark Office*